March 28, 1967 A. ZETTEL 3,310,990
BACKLASH ELIMINATING GEARING FOR STEERING GEAR ASSEMBLIES
Filed Aug. 17, 1964 6 Sheets-Sheet 1

INVENTOR

BY Albert M Zalkind

ATTORNEY

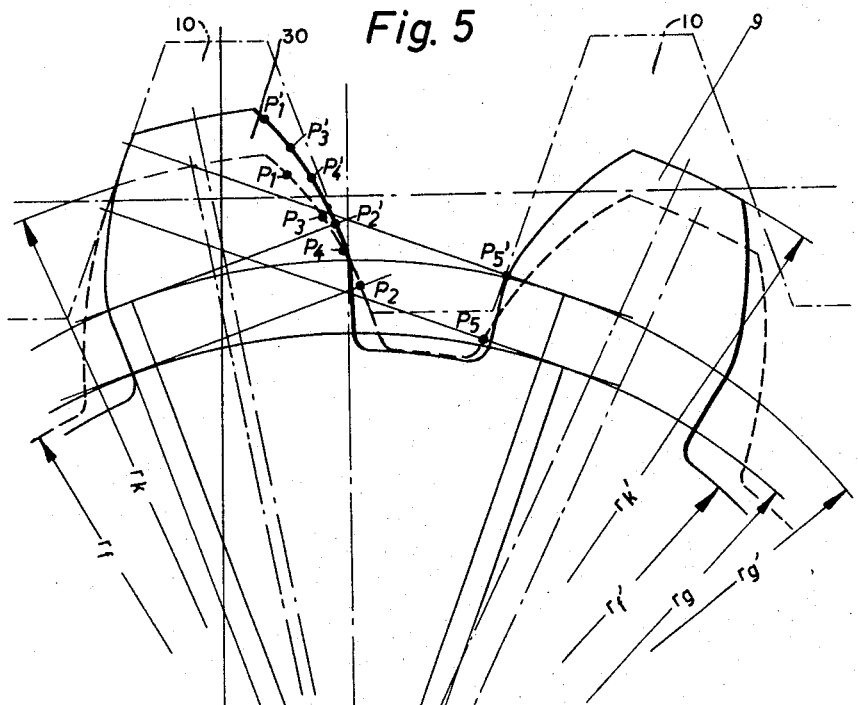
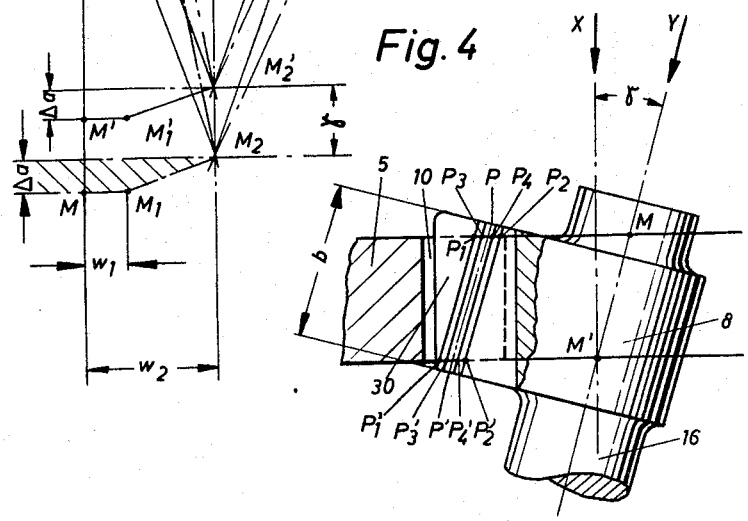

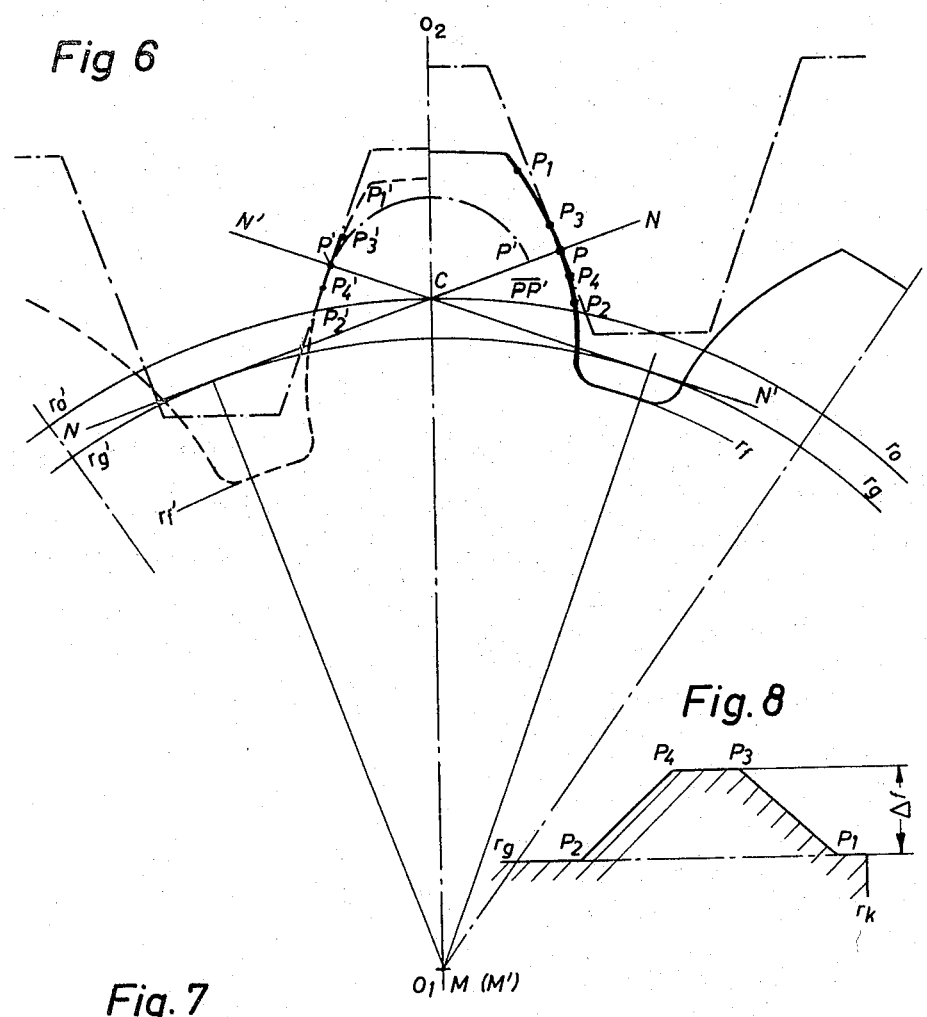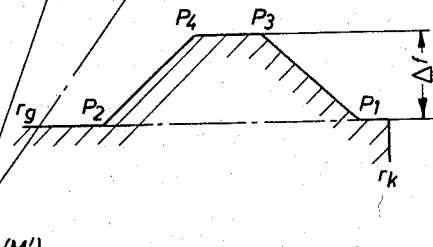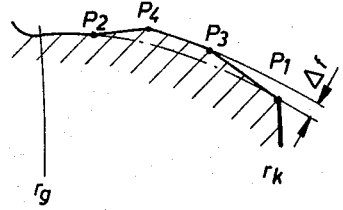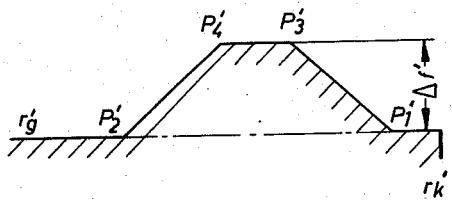

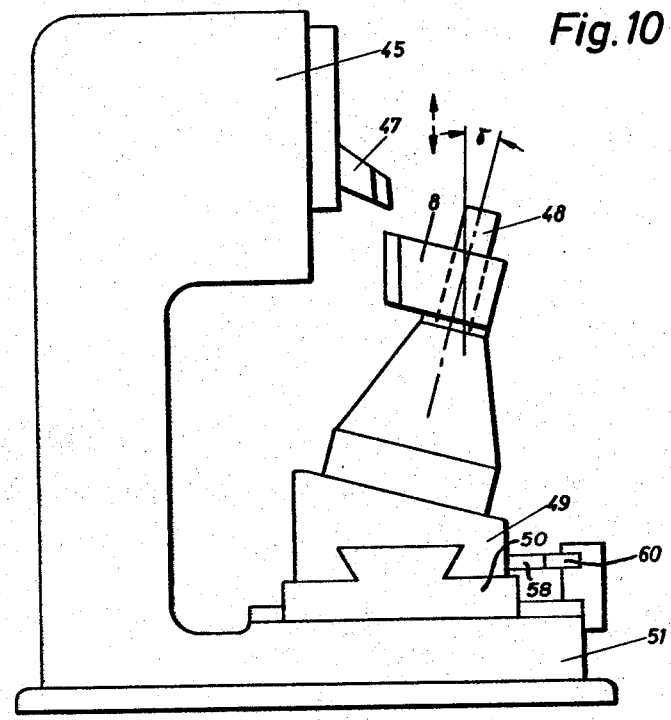
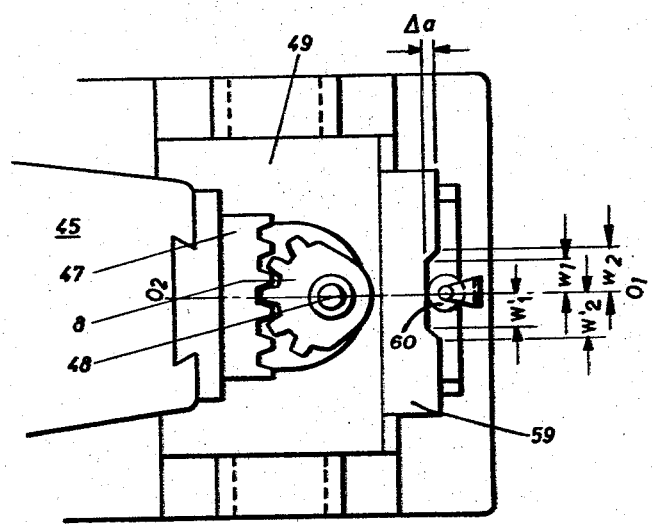

United States Patent Office 3,310,990
Patented Mar. 28, 1967

3,310,990
BACKLASH ELIMINATING GEARING FOR STEERING GEAR ASSEMBLIES
Albert Zettel, Schwabisch Gmund, Germany, assignor to Zahnradfabrik Friedrichshafen Aktiengesellschaft, Friedrichshafen, Germany
Filed Aug. 17, 1964, Ser. No. 389,977
Claims priority, application Germany, Aug. 17, 1963, Z 10,298
6 Claims. (Cl. 74—409)

This invention relates to steering gear assemblies for vehicles and more particularly to involute gears having variable backlash.

In steering gear assemblies utilizing meshing gears having involute profiles, the backlash between the meshing teeth are purposely varied so that less backlash will exist in the neutral position of the teeth holding the steering linkages in a position for straight-ahead travel of the vehicle. More backlash in the end positions of the gears on the other hand exists so as to avoid jamming of the gears when executing turns, such jamming otherwise occuring because of adjustments made to reduce backlash developed from the more rapid wear of the teeth which contact in the neutral position of the gears. The problem is even more aggravated when utilizing teeth on one of the gears cut on a conical surface, since the tooth profiles then vary in an axial direction. Interference often occurs in such case due to jamming of the addenda of the teeth after corrections are made to eliminate backlash. Further, the latter type of gear is cut with a corrected tool so that meshing conditions in the neutral phase positions of the gears do not coincide with meshing conditions in the end phase positions. Accordingly, disturbances develop during mesh particularly when any adjustments are made for backlash.

Several attempts have been made to overcome the aforementioned problems including shortening of the tooth addendum and correction of the tooth flanks. Meshing disturbances have not, however, been eliminated by such measures. It is, therefore, a primary object of the present invention to overcome the foregoing problems encountered in adjusting for backlash by modifying the variations in involuae profile of the teeth surface portions which contact in the neutral phase positions of the gears.

In accordance with the foregoing object, modification of the tooth profile is restricted to flank surface areas to which gear contact is confined as the neutral position of the gears is approached from either direction. Backlash is thereby completely eliminated within a limited neutral meshing zone within which even negative backlash may be achieved to provide a definite "feel" for the neutral position of the gears. Beyond this limited neutral meshing zone, the backlash increases to a maximum amount where the unmodified involute profile begins. The deviation from the regular involute profile is, therefore, determined by the acceptable amount of maximum backlash at the end positions of the gears.

The faultless meshing or conjugate action between the gear tooth surfaces is also preserved as the gears move from the end positions to the neutral position free of backlash, by effecting the modification of the regular profile through shift to the gear center or effective pitch line with respect to which the tooth profile is generated. In this regard, it is well known that limited shift of gear centers is tolerable in connection with meshing teeth having involute profiles. It is, therefore, another object of the present invention to eliminate backlash in the neutral position of the gears without disturbance of the meshing conditions.

The profile modification effected in accordance with the foregoing objects results in dimensional enlargement of the profile width of a central tooth or corresponding dimensional variation in the tooth space associated with the meshing situation in the neutral position of the gears.

A still further object in accordance with the foregoing objects is to provide a machine and method for cutting involute gear teeth conforming to the requirements the present invention by shifting of the gear center of a gear blank or workpiece during a limited phase of the generating movement of the workpiece with respect to the cutter.

These, together with other objects and advantages which will become subsequently apparent, reside in the details of construction, operation and procedures, as more fully hereinafter described and claimed, reference being had to the accompanying drawings forming part hereof, and in which:

FIGURE 4 is a side sectional view through the meshing gears shown in FIGURE 3;

FIGURE 5 is a diagrammatic view of meshing conditions displaced from the neutral position of the gears in different axial planes;

FIGURE 6 is a diagrammatic view of meshing conditions in different planes in the neutral position of the gears;

FIGURE 7 is a partial sectional view of a profile modified portion of a tooth flank of the sector gear;

FIGURES 8 and 9 are diagrammatic views of the profile modifications in different axial planes of the sector gear;

FIGURE 10 is a side elevational view of one form of gear cutting machine in accordance with the present invention;

FIGURE 11 is a top plan view of the machine shown in FIGURE 10; and

Figure 1:
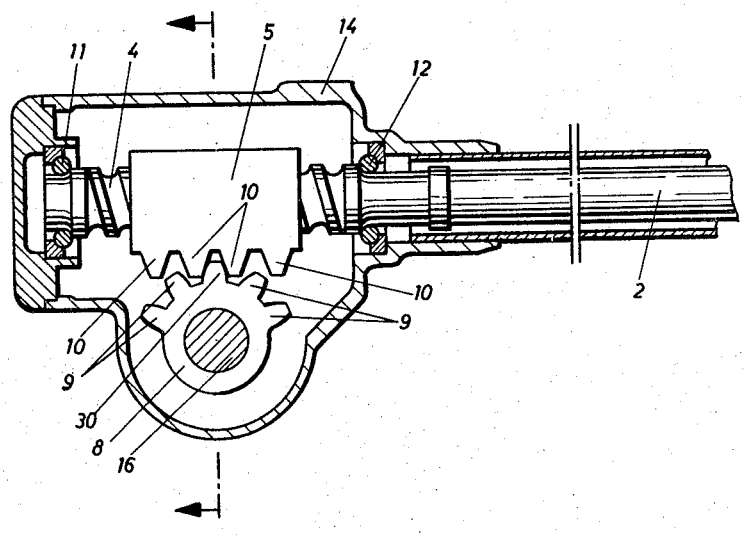
FIGURE 1 is a section through a steering gear assembly to which the present invention pertains.
Figure 2:
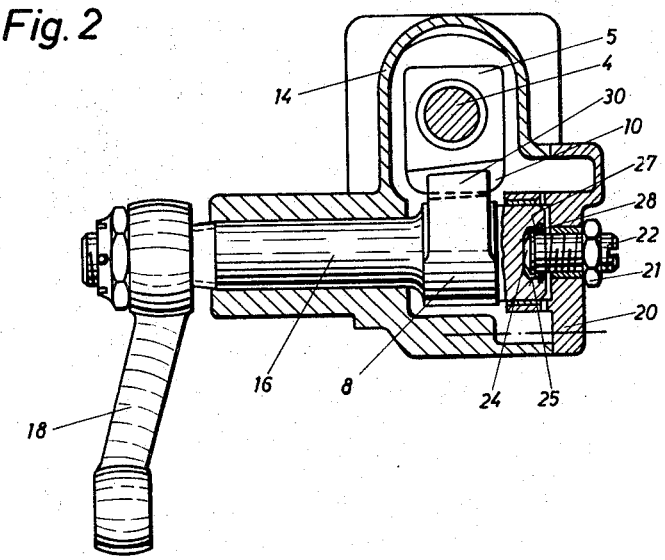
FIGURE 2 is a sectional view taken substantially through section line II—II in FIGURE 1.

Referring now to the drawings in detail and initially to FIGURES 1 and 2, it will be noted that the invention pertains to a steering gear assembly of the type having a threaded portion 4 at one end of a steering shaft 2, journaled between axially spaced bearings 11 and 12 within housing 14. A nut 5 is threadedly mounted preferably by anti-friction channeled ball elements on the threaded portion 4 for axial movement therealong in opposite directions upon rotation of the steering shaft 2 by the steering handwheel (not shown). On one longitudinal side of the nut 5, rack gear teeth 10 are formed for constant mesh with gear teeth 9 and 30 formed on a sector gear member 8 fixed to and rotatably mounted by driven shaft 16. The usual steering gear arm 18 is connected to the shaft 16 for imparting movement to the steering linkages.

As shown in FIGURE 2, the teeth on the sector gear member 8 are formed along the face thereof on radial elements of a conical surface by means of a standard hob cutter so that by axial adjustment of the shaft 16, backlash that develops between the teeth of the sector gear member 8 and the nut 5 may be eliminated. Toward this end, one axial end of shaft 16 is provided with a socket 25 for support of the end of the shaft on an axial bearing portion 24 connected to an externally threaded adjustment screw 22 extending through the end bearing cover 20 associated with housing 14. The screw 22 is held in an axially adjusted position by means of a washer 27 retained in the socket 25 by snap ring 28 on the inside of the housing while a locknut 21 is threadedly mounted on the screw, bearing against the cover 20 on the outside of the housing. The adjusting facilities so provided will enable one to obtain mesh between the central gear tooth 30 and the teeth 10 on the nut without any play in the neutral position of the steering shaft 2 for straight-ahead travel of the vehicle. The central tooth 30 as compared to the lateral teeth 9 is dimensioned larger so that any adjustments made to eliminate play in the neutral position of the teeth will not produce any jamming between the teeth 10 and 9 in the end positions of the steering gear.

Figure 3:
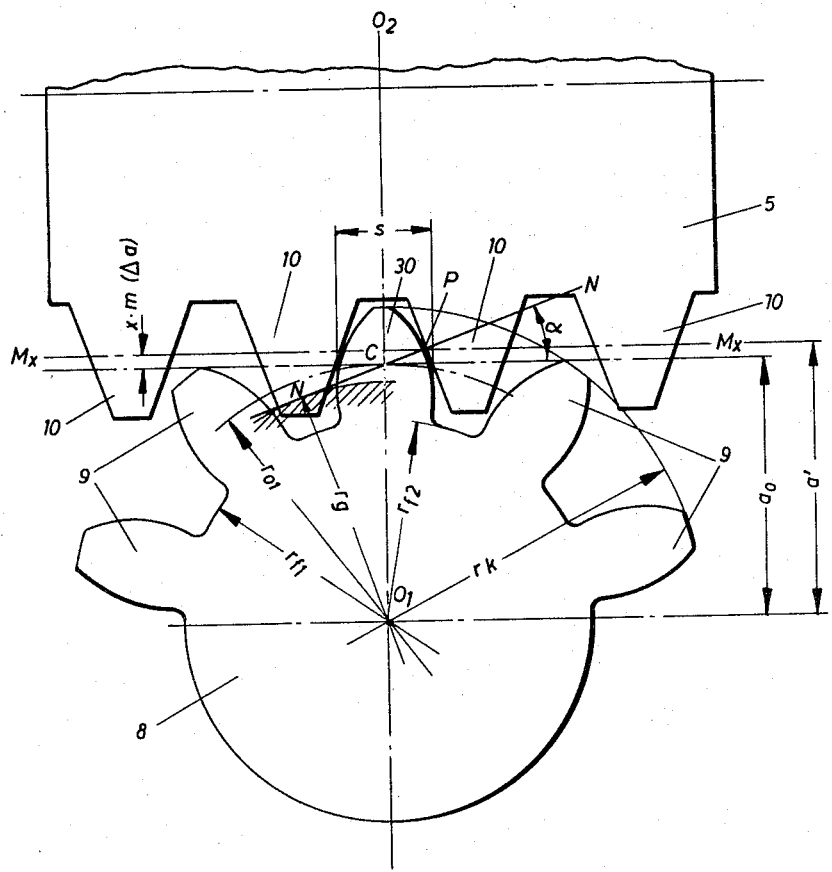
FIGURE 3 is a diagrammatic view of the meshing conditions in the neutral position of the gears.

Inasmuch as the gear teeth on the sector gear are cut along radial elements of a conical surface, the width and tooth spaces vary in an axial direction. Contact between the central tooth 30 and the rack teeth 10 will be established in some axial meshing plane as depicted in FIGURE 3 wherein M$x$–M$x$ is the pitch line of the rack teeth on tool 47 when cutting teeth 9. The dimensional enlargement of the center tooth 30 as compared to teeth 9 corresponds to an increased distance $\Delta a$ between the rack teeth pitch line of tool 47 when cutting the tooth 30 and the center of the sector gear because of corrective shift. This type of dimensional deviation is based upon the use of involute tooth profiles wherein limited variations between gear centers is permissible without changing the base circle radius upon which development of the involute curvature depends. Accordingly, the same base circle radius $r_g$ is maintained for both teeth 9 and tooth 30 as well as the same addendum circle radius $r_k$. The distance $a_0$ between pitch line M$x$–M$x$ and the center $O_1$ of the sector gear in the meshing plane depicted in FIG. 3 therefore corresponds to the profile of teeth 9, whereas the increased distance $a'$ between the gear center $O_1$ and the pitch line resulting from corrective shift between the sector gear and rack teeth corresponds to the profile of gear tooth 30 having an increased tooth width S. The dedendum circle radius $r_f^2$ of teeth 9 as a consequence of the foregoing is larger than $r_f^1$. The line of action N—N tangent to the base circle intersects the center $O_1$–$O_2$ at point C to define the pitch circle at radius $rO_1$ and the point of contact P in the neutral position of the steering gear.

Referring now to FIGURES 4, 5 and 6, it will be observed that the teeth on the sector gear 8 are cut by movement of the gear cutting tool along a cutting axis on the surface of a cone inclined at an angle $\gamma$ to the rotational axis of the shaft 16. The gear tooth 30 has an axial width $b$ exceeding that of the rack teeth 10 on the nut 5 and varies in profile width S between opposite axial sides of the sector gear in view of the convergence of the cutting axes toward the apex of the cone. Since the base circle of the gear teeth are equal in radius $r_g$, as aforementioned, all points of contacts P, $P_1$, $P_2$, $P_3$, $P_4$ on the faces and flanks of gear tooth 30 lie on lines $\overline{PP'}$, $\overline{P_1P_1'}$, $\overline{P_2P_2'}$, $\overline{P_3P_3'}$, $\overline{P_4P_4'}$ parallel to the rotational axis MM' of sector gear 8, as shown in FIG. 4. It will, however, be noted from FIGURES 4 and 5 that there is a variation in the radius of the addendum circle $r_k$, $r_k'$ and the dedendum circle $r_f$, $r_f'$ in the axial direction.

It will be apparent from the foregoing that the lines of contacts between the meshing teeth will be preserved for all axially adjusted positions of the sector gear since adjustment along its axis MM' is parallel to the lines of contact. The tooth profiles will, however, vary continuously in an axial direction. A further variation in tooth profile is, however, imposed on the central tooth 30, as aformentioned so as to enlarge its profile width between points of contact $P_1$ and $P_2$ in one axial meshing plane for example on opposite sides of the point of contact P established when the gears are in the neutral position. Accordingly, the tooth 30 is altered from its involute profile between the lines of contact $\overline{P_1P_1'}$ and $\overline{P_2P_2'}$ involving a dimensional increase from $\overline{P_1P_1'}$ to a maximum at $\overline{P_3P_3'}$ and then a decrease on the opposite side of $\overline{PP'}$ from $\overline{P_4P_4'}$ to $\overline{P_2P_2'}$. This additional variation in the profile of central tooth 30 is produced by a radial shift of the tooth segment 8 by the amount $\Delta a$ in the direction of $O_1O_2$ away from the rack cutter 47 as the carriage 49 mounting the tooth segment moves parallel to the cutter from the neutral position in either direction from line $\overline{O_1O_2}$ by a distance $W_2$, $W_2'$ for example. The resulting profiles of central tooth 30 will accordingly deviate from the profile curvatures extending from addendum circles to contact line $P_1P_1'$ and from contact $P_4P_4'$ down to the dedendum circle as shown in FIG. 5. Backlash between meshing teeth of the gear members 8 and 10 may thereby be completely eliminated as the nut 5 moves parallel to the axis of the steering shaft 2 in either direction from the neutral position by an amount $W_1W_1'$. Movement beyond this amount is accompanied by backlash which increases to a maximum when contact moves beyond distance $W_2W_2'$ from the neutral position. The maximum backlash value will then remain constant until the extreme end positions of the gears is attained. Also, the variations of the profile of the central tooth 30 produced by the aforementioned shift of the segment 8 could be computed from the expression $b$ equals $(\Delta a) \propto \sin \alpha$, where $\alpha$ is the pressure angle of the gears and this quantity used to compute the amount of shift necessary to produce a given backlash value in accordance with the procedure outlined hereinbefore.

The profile deviation produced in one axial plane through tooth 30, is shown in FIGURE 7 involving a deviation of $\Delta f$ from the true involute curvature and extending between contact points $P_1$ and $P_2$, as aformentioned. FIG. 8 shows the deviation on a rolled out involute curvature of FIGURE 7. In FIGURE 9, the deviation $\Delta f'$ from the involute profile of tooth 30 is shown in another plane in which contacts $P_1'$, $P_2'$, $P_3'$ and $P_4'$ are established. The value of the deviations $\Delta f$, $\Delta f'$ is determined by the amount of backlash which is still acceptable between teeth profiles in the extreme end positions of the gears. Gear flank testing instruments may therefore be utilized to measure and record the deviations $\Delta f$, $\Delta f'$ of opposite tool flanks in connection with formation thereof when cutting the gear teeth.

Figure 12:
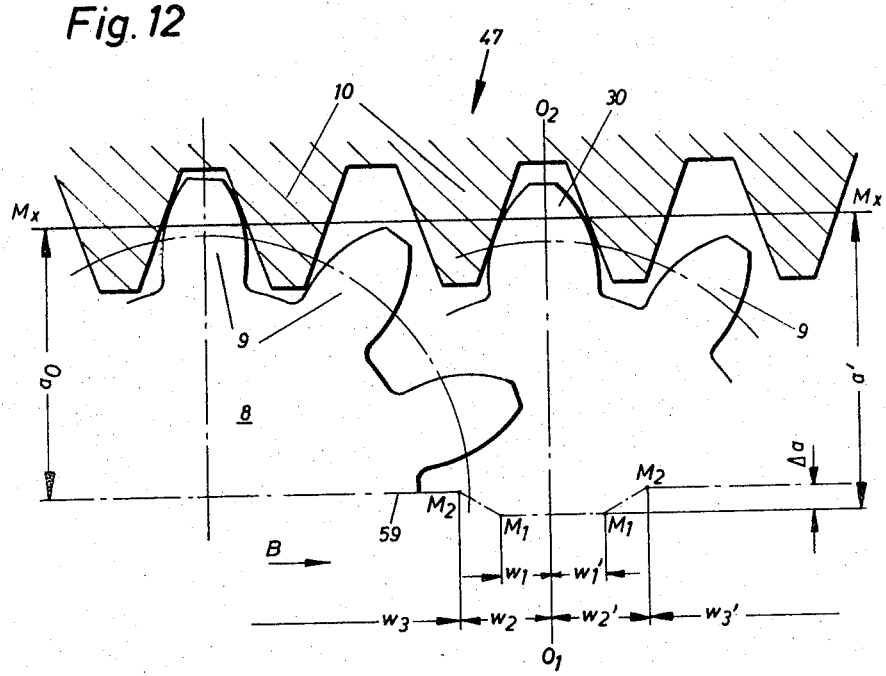
FIGURE 12 is a diagrammatic view of the modified gear cutting relationships of the gear cutting machine in accordance with the present invention.

FIGURES 10 and 11 show one form of gear cutting arrangement by means of which the gears may be cut with the aforementioned deviations in the involute profiles by changing the gear center locations during the cutting process utilizing a rack cutter 47. The rack cutter is operatively mounted on the cutting machine frame 45 for operation on a workpiece in the usual manner. The workpiece in the present case, of course, is the sector gear 8 fixedly mounted on the work post 48 which is angularly displaced about its longitudinal axis to generate the teeth profiles on the workpiece as the carriage 49 mounting the post 48 is moved parallel to the cutter 47. The carriage 49 is in turn mounted on a slide 50 for movement on the bed 51 in a direction transverse to the direction of movement of the carriage 49. Transverse movement of slide 50 occurs in response to reciprocation of the carriage 49 under control of cam member 58 fixed to carriage 49 and having a guide surface 59 biased into contact with guide roller 60 fixedly mounted on the bed 51. As will be noted in FIGURE 10, the work post 48 is disposed at an angle $\alpha$ to the vertical for cutting the teeth from a conical surface in accordance with the present invention. Further, as noted in FIGURES 11 and 12, the slide 50 is shifted transversely during the cutting stroke by an amount equal to $\Delta a$ under control of the guide surface 59 and the roller 60. The projection on the guide surface therefore extends a distance $W_2$ on one side of the neutral line $\overline{O_1O_2}$ with a maximum deviation portion thereof extending a distance of $W_1$ in order to change the gear center distance from the pitch line of the rack cutter during the indicated phase of the cutting stroke. The gear center shift varies to distances $W_1'$ and $W_2'$ as the cutting tool is reciprocated vertically through the workpiece to progressively cut the teeth along the conical surface. The dimensional enlargement of the center tooth 30 over the normal involute profiles of teeth 9 are thereby effected.

In accordance with the dimension of the gear members of a steering gear mechanism and the value of the contact ratio the invention provides also a profile deviation extending beyond the flank portion of the central tooth 30 to one of the flanks of the teeth 9 adjacent to the central tooth. As to be seen in FIG. 5, the flank of the teeth 9 in face of central tooth 30 deviates from the basic involute profile on a flank zone extending between the dedendum circle $rf'$ and the contact line $P_5P_5'$ corresponding to a generating path $W_2$, $W_2'$ in either direction from the central position.

It will be appreciated that other gear cutting tools and methods could be utilized in accordance with the principles of the present invention where the tool shaping operation is based on involute profiling. Further, the principles are also applicable to cylindrical, straight, oblique and worm gear arrangements as well as conical configurations as hereinbefore described. Modified involute profiles may also be corrected in accordance with the present invention to eliminate backlash in the central phase portion of the gear meshing stroke and is equally applicable to dimensional correction of a tooth space as well as the profile width of a tooth.

The foregoing is considered as illustrative only of the principles of the invention. Further, since numerous modifications and changes will readily occur to those skilled in the art, it is not desired to limit the invention to the exact structure and operation shown and described, and accordingly all suitable modifications and equivalents may be resorted to, falling within the scope of the invention as claimed.

What is claimed as new is as follows:

1. In a steering gear assembly having meshing gears with involute teeth profiles, at least one of said gears having teeth which vary in profile width along the rotational axis of the one gear, said gears meshing with backlash varying from zero at a neutral position between end meshing positions thereof said backlash being zero at a neutral position, said one gear having at least one tooth with a flank surface zone to which contact with the other gear is confined as the gears approach said neutral position between said end positions, said flank surface zone having a deviation from the profile curvature thereof as defined on all other flank surfaces of the teeth of said one gear, said deviation corresponding to a difference in pitch radii between said one tooth and the other teeth of said one gear limited to said flank surface zone only.

2. The steering gear assembly defined in claim 1 wherein flank surface zones with profile deviations are formed adjacent to each other on a tooth of said one gear between addendum and dedendum portions thereof, said profile deviations enlarging the varying profile width of said tooth along said flank surface zones which extend parallel to the rotational axis of said one gear.

3. The steering gear assembly defined in claim 2 wherein said profile deviation is maximum along the line of contact on the flank surface zone corresponding to the neutral position of the gears.

4. The steering gear assembly defined in claim 3 wherein said line of contact is centrally located within said flank surface zone.

5. The steering gear assembly defined in claim 1 wherein said profile deviation is maximum along the line of contact on the flank surface zone corresponding to the neutral position of the gears.

6. The steering gear assembly defined in claim 1 wherein said line of contact is centrally located within said flank surface zone.

References Cited by the Examiner
UNITED STATES PATENTS

| 2,226,038 | 12/1940 | Westcott et al. | 74—499 |
| 2,246,671 | 6/1941 | Fischer | 90—8 |
| 2,255,094 | 9/1941 | Aeppli | 90—8 |
| 2,916,945 | 12/1959 | Rittenhouse et al. | 74—499 |
| 3,060,762 | 10/1962 | Lutz | 74—499 |
| 3,064,491 | 11/1962 | Bishop | 74—498 X |
| 3,267,763 | 8/1966 | Merritt | 74—422 |

MILTON KAUFMAN, *Primary Examiner.*